United States Patent [19] [11] E Patent Number: Re. 28,377
[45] Reissued Date of Patent: Mar. 25, 1975

28,377

SELECTED 5-SUBSTITUTED-5-PHENYLALKYL BARBITURIC ACIDS

Carlos M. Samour, Wellesley, and Julius A. Vida, Boston, Mass., by The Kendall Co., Walpole, Mass., assignee No Drawing. Original No. 3,784,547, dated Jan. 8, 1974, Ser. No. 181,543, Sept. 17, 1971, which is a continuation-in-part of abandoned application Ser. No. 88,193, Nov. 9, 1970. Application for reissue Jan. 24, 1974, Ser. No. 436,159

Int. Cl. C07d *51/20*

U.S. Cl. 260—257 17 Claims

Matter enclosed in heavy brackets [ ] appears in the original patent but forms no part of this reissue specification; matter printed in italics indicates the additions made by reissue.

ABSTRACT OF THE DISCLOSURE

Selected 5-substituted-5-phenylalkyl barbituric acids having the formula

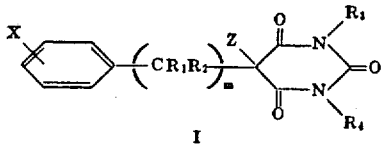

I wherein m is 1 or 2; $R_1$ and $R_2$ are independently selected hydrogen, methyl or ethyl, with the provisos that the radical $(CR_1R_2)_m$ can contain no more than one ethyl group or two methyl groups, that when m is 1 said radical contains at least one hydrogen and that when m is 2 said radical contains at least two hydrogens; $R_3$ and $R_4$ are independently selected hydrogen or methyl, or $R_3$ and $R_4$ are both methoxymethyl or acetoxymethyl; X is hydrogen, chlorine, $—NO_2$ or methoxy; and Z is

[hydroxyl,]—O—R′ or —O—C(=O)—R′ wherein R′ is alkyl having 1 to 3 carbon atoms, or $—OSi(R'')_3$ wherein R″ is methyl or ethyl. These compounds are useful as analgetics [or intermediates for the preparation of analgetics].

This application is a continuation-in-part of copending application Serial No. 88,193, filed Nov. 9, 1970, now abandoned.

This invention relates to selected 5-substituted-5-phenylalkyl barbituric acids having utility as analgetics, [to intermediates useful in the preparation of these analgetics,] to a method of treating symptoms of pain in warm-blooded animals employing said analgetics and to therapeutic compositions containing same.

More specifically, this invention relates to compounds having the formula

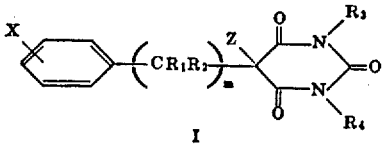

I wherein m is 1 or 2; $R_1$ and $R_2$ are independently selected hydrogen, methyl or ethyl, with the provisos that the radical $(CR_1R_2)_m$ can contain no more than one ethyl group or two methyl groups, that when m is 1 said radical contains at least one hydrogen and that when m is 2 said radical contains at least two hydrogens; $R_3$ and $R_4$ are independently selected hydrogen or methyl, or $R_3$ and $R_4$ are both methoxymethyl or acetoxymethyl; X is hydrogen, chlorine, $—NO_2$ or methoxy; and Z is

[hydroxyl,]—O—R′ or —O—C(=O)—R′ wherein R′ is alkyl having 1 to 3 carbon atoms, or $—OSi(R'')_3$ wherein R″ is methyl or ethyl.

Various 5-substituted barbituric acids have been previously prepared and reported in the literature. Thus, U.S. Pat. 3,464,990 discloses barbituric acids having certain hydroxy phenylalkyl, lower alkoxy phenylalkyl or aralkoxy phenylalkyl substituents, together with hydrogen or a lower alkyl, alkenyl or alkynyl group at the 5-position; these compounds are taught to be useful as tranquilizers. The synthesis of 5-methyl-5-substituted benzyl barbituric acids is reported by J. P. Trivedi and J. J. Trivedi in Journal Indian Chem. Soc., vol. 35, No. 9, 1958. While no specific therapeutic uses for these compounds are disclosed, the purpose of the synthesis was to prepare compounds which would not have convulsive properties.

Now it has been found that compounds having the Formula I wherein Z is

—O—R′, —O—C(=O)—R′ or $—OSi(R'')_3$ are valuable analgetics, useful in treating symptoms of pain. Those compounds I where Z is hydroxyl are intermediates for the preparation of these highly efficacious analgetics.

The preparation of most of the compounds of this invention is illustrated by the following general reaction scheme wherein X, $R_1$, $R_2$, m and R′ are as previously described and R‴ is alkyl.

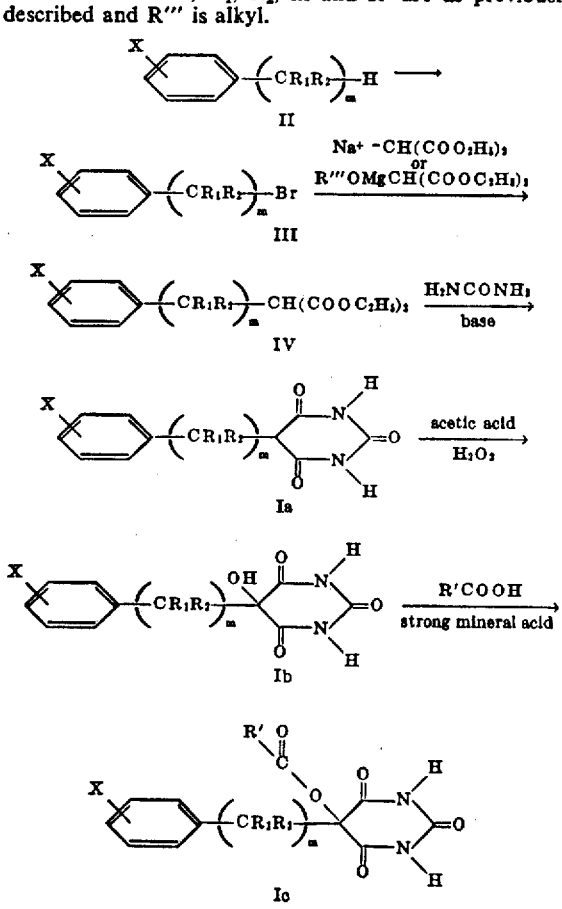

In the above reaction scheme, the bromoalkylbenzenes I are generally commercially available compounds. lternately, they are prepared from the appropriate alkyl enzene II according to conventional techniques. For ample, where certain bromoalkylbenzenes III are de- red, an alkyl benzene such as toluene, 2-phenylpropane, -phenylpentane, p-chlorotoluene, 2-(m-hydroxyphenyl)- utane, m-ethoxytoluene, p-diethylaminophenyl ethane, c. is brominated in the presence of ultraviolet light. lternately, the bromoalkylbenzenes III can be provided y reacting a suitable alkylbenzene with N-bromosuc- inimide. According to another technique, bromination carried out by reacting an appropriate olefinic com- ound, such as 2-phenyl-1-propene, p-bromophenyl eth- lene, etc. with hydrogen bromide and hydrogen peroxide ccording to the Anti-Markonikov reaction. Some bromo- lkylbenzenes III are provided by reacting an appropriate lcohol, for example, 2-ethyl-2-phenyl-butan-1-ol, -methyl-2-phenyl-butan-1-ol, etc. with phosphorus tri- romide according to the process disclosed by T. H. ommer et al. in J. Am. Chem. Soc. 73, 3542 (1951). While compound III is preferably a bromoalkylbenzene, t will be apparent that a chloroalkylbenzene or an iodo- lkylbenzene can also be employed in the preparation of ompounds I.

In the next step of the reaction scheme, compound III s reacted with diethylmalonate in the presence of sodium thoxide or with an appropriate diethyl alkoxy magne- ium malonate to provide the corresponding diethyl henyl alkyl malonate IV.

Compound IV is then reacted with urea in the presence f a base such as alkali metal ethoxide at a temperature f about 20° to about 80° C. to provide compound Ia, hich is a 5-phenylalkyl barbituric acid.

In this step, it is postulated that compound IV forms n N-monocarbamido-1-phenylalkyl malondiamide in situ nd that this latter compound is subsequently converted o compound Ia. Some compounds IV provide malondi- mides that can be isolated from the reaction mixture. Thus, for example, where m is 1, $R_1$ is hydrogen and $R_2$ is ethyl, a stable malondiamide can be isolated, which is hen converted to the 5-phenylalkyl barbituric acid by treatment with additional base.

In the next step, the 5-phenylalkyl barbituric acid Ia is converted to the corresponding 5-hydroxy-5-phenyl- alkyl barbituric acid Ib by treatment with aqueous hydro- gen peroxide in the presence of acetic acid.

Then the 5-hydroxy-5-phenylalkyl barbituric acid Ib is reacted with an appropriate organic acid, such as acetic acid, butyric acid, in the presence of a strong min- eral acid to provide the 5-acyloxy-5-phenylalkyl barbi- turic acid Ic. Alternately the acylation can be carried out by reacting compound Ib with an appropriate acyl chlo- ride in the presence of a base. In the aforementioned reactions to provide compound Ic, reaction temperatures of from about 0° C. to the boiling point of the medium employed in the reaction are conveniently employed.

The compounds having the formula I which are not included in the previously described reaction scheme are readily provided by modifications and additional treat- ments of some of the intermediates and products. Thus, compounds I wherein Z is —O—R′ are provided by first reacting diethyl bromomalonate with an alkali metal alkoxide having the formula MOR′ wherein M is an alkali metal and R′ is as previously described to provide a di- ethyl alkoxy malonate. Then this malonate is reacted with a bromoalkyl benzene III in the presence of sodium ethoxide to yield the appropriate diethyl alkoxy phenyl- alkyl malonate, which is condensed with urea in the pres- ence of base, as previously described, to provide the cor- responding compound I. Compounds I wherein Z is $OSi(R'')_3$ are prepared by reacting the 5-hydroxy-5- phenylalkyl barbituric acid Ib with trimethyl chlorosilane or triethyl chlorosilane in the presence of a base, such as pyridine, triethyl amine etc. Reaction temperatures of from about 0° C. to the boiling point of the reaction medium are preferably employed in the aforementioned reactions.

Compounds I having substitution on the ring nitrogens are obtained by reacting compounds Ia, Ib or Ic with an appropriate reactant. Thus, compounds I wherein $R_3$ or $R_4$ is methyl are provided by reaction with methyl iodide in the presence of lithium hydride at a temperature of 0° C. to 50° C. Where compounds having the formula I wherein $R_3$ and $R_4$ are methoxymethyl are desired, chloromethyl methyl ether is reacted with compounds Ia, Ib or Ic at a temperature from about −10° C. up to the boiling point of any diluent that is employed in the proc- ess. In order to prepare compounds I wherein $R_3$ and $R_4$ are acetoxymethyl, compounds Ia, Ib, or Ic are reacted with chloromethyl methyl ether to form the appropriate N,N′-dimethoxymethyl compounds; these compounds are then reacted with acetic anhydride in the presence of a Lewis acid catalyst such as stannic chloride, aluminum chloride, boron trifluoride, etc.

Most of the reactions to provide compounds I are pref- erably carried out in the presence of an inert diluent, such as dimethyl formamide, dimethyl sulfoxide, dimethyl acetamide, hexamethylphosphoramide, etc.

Compounds I are readily obtained in high yields and excellent purity, and are conveniently isolated from their reaction mixtures by techniques such as distillation, crys- tallization, preparative column chromatography, etc.

While any compound having the Formula I wherein Z is $$-O-\overset{O}{\overset{\|}{C}}-R',$$

—O—R′ or $—OSi(R'')_3$ is an effective analgetic, pre- ferred embodiments employ those compounds I wherein Z is $$-O-\overset{O}{\overset{\|}{C}}-R'$$

where R′ is alkyl having 1 to 3 carbon atoms; m is 1 and X, $R_3$ and $R_4$ are hydrogen.

Where X in Formula I is other than hydrogen, it is preferred that it be in the para-position.

For this application, the compounds can be formulated for oral or parenteral administration according to con- ventional techniques. Effectiveness and toxicity of these compounds is such that each dosage unit can contain from 5 to 500 mg. of active material. Compositions for oral administration can be solid or liquid and can take the form of syrups, isotonic solutions, tablets, capsules etc. Suitable solid physiologically acceptable carriers in- clude lactose, magnesium stearate, sucrose, talc, stearic acid, gelatin, polyvinyl pyrrolidone etc. Exemplary liquid physiologically acceptable carriers are peanut oil, olive oil, sesame oil and water. Furthermore the carrier may include a time delay material such as glyceryl monostea- rate or glyceryl distearate, alone or in combination with a wax.

If a solid carrier is used, the preparation can be tab- letted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

For parenteral administration, the carrier or excipient may be a sterile, parenterally acceptable liquid: e.g., water or a parenterally acceptable oil; e.g., arachis oil contained in ampules.

While any of the above compositions are efficacious, preferred are tablets for oral administration.

All tests were conducted on adult albino male mice (Charles River strain); the dosage consisted of the active agent suspended in 10% aqueous acacia and was admin- istered orally and/or subcutaneously as indicated.

Acute oral toxicity and acute intraperitoneal toxicity were determined in the conventional manner. The results were expressed as $LD_{50}$, the dose required to produce death in 50% of the animals treated, determined graphically, with the 95% limits shown in parentheses.

Two established procedures were employed to determine analgetic activity. The method described by Eddy, N.B., and Leimbach, D., J. Pharmacol. Exptl. Therap. 107, 385 (1953) was followed, with the following modifications, in the first procedure. Mice are pretested by placing them individually on the cleaned surface of a copper water bath, the temperature of which is maintained at 54–55° C. The reaction time to this noxious thermal stimulus is the time in seconds required for either licking of the paws or jumping, such that all four paws leave the surface of the plate. The drug is then administered orally or subcutaneously, generally at fibe dosage levels (10 mice per dosage level), and the reaction times are redetermined at intervals of ½ hour, 1 hour, and 2 hours; the time of peak activity is the time at which the greatest number of animals is protected. From the pretreatment reaction times the mean and standard deviations are computed. The cut-off time is taken to be the mean reaction time plus 2 standard deviation units. Reaction times equal to or exceeding this cut-off time are considered to represent analgetic responses. The dosage required to produce an algetic response in 50% of the animals ($ED_{50}$ and 95% limits) is computed graphically.

In the second procedure, the method of Siegmund, E., et al. reported in Proc. Soc. Exptl. Biol. and Med. 95, 729, (1957) was generally followed. The method is based on the antagonism by both non-narcotic and narcotic analgetics of a syndrome induced in mice following introperitoneal injection of phenyl-p-quinone. The syndrome is characterized by intermittent contractions of the abdomen, twisting and turning of the trunk, and extension of the hind legs, beginning 3 to 10 minutes after the injection and persisting for more than one hour. The test drug is admnistered orally at four to five dosage levels. At the time of peak activity, 0.25 ml. of a 0.02 percent solution of phenyl-p-quinone in 5 percent (aqueous) ethyl alcohol is injected intraperitoneally. Inhibition of the syndrome is considered an analgetic response. The dosage required for this effect in 50% of the mice ($ED_{50}$) is computed graphically.

The following examples will serve to illustrate the practice of this invention.

EXAMPLE 1

(A) Preparation of reactants

Bromine (1360.8 g.) was slowly dripped into refluxing ethylbenzene (2.5 kg.) under illumination by ultraviolet light over a period of one and one-third hours. After purging off the hydrobromic acid by-product, the mixture was distilled to remove unreacted ethylbenzene. Distillation at 104–108° C./20 mm. Hg provided 673.9 g. of 1-bromoethylbenzene, $n_D^{27}$ 1.3503.

Diethyl malonate (160 g.) was added to a solution of sodium (23 g.) in 500 ml. absolute ethanol in a three-necked round bottom flask. Then 185 g. of 1-bromoethylbenzene was added dropwise over a period of one hour. After heating at reflux for three hours, the reaction mixture was allowed to cool to room temperature and stand overnight. Hydrochloric acid (10 ml. of a 38% solution) was added to adjust the pH of the reaction mixture to one. The reaction mixture was filtered to separate sodium bromide and then evaporated in vacuo to remove solvent. After a second filtration to remove additional sodium bromide, the reaction mixture was distilled to provide a fraction boiling at 153–160° C./5 mm. Hg. A second distillation yielded 238 g. of diethyl (1-phenylethyl)-malonate, B.P. 153–155° C./5 mm. Hg. The following analytical data confirmed that the product had been obtained.

Analysis.—Calc'd for $C_{15}H_{20}O_4$ (percent): C, 68.16; H. 7.63. Found (percent): C, 68.20; H, 7.55.

Urea (240 g.) was added to a solution of sodium ethoxide, prepared from sodium (54.8 g.) and ethanol (800 ml.). Then 264 g. of the diethyl (1-phenylethyl)-malonate prepared in part A was added and the reaction mixture heated overnight at reflux. After allowing the mixture to cool to room temperature, the sodium salt precipitate was removed by filtration, dissolved in water and re-precipitated with hydrochloric acid to provide 224.7 g. of dry 5-(1-phenylethyl)-barbituric acid, M.P. 218–220- C.

Analysis.—Calc'd for $C_{12}H_{12}O_3N_2$ (percent): C, 62.06; H, 5.21; N, 12.06; O, 20.67. Found (percent): C, 61.88; H. 5.17; N, 11.88.

(B) Preparation of 5-hydroxy-5-(1-phenylethyl)-barbituric acid

The amount of 50 g. of the 5-(1-phenylethyl)-barbituric acid prepared in part A was added to 90 ml. of 30% $H_2O_2$ solution in 300 ml. of acetic acid and the resulting mixture heated to 60° C. to provide a homogeneous solution, which was stirred at room temperature overnight. Then 100 ml. of water and 200 ml. of methanol were added to the reaction solution. After evaporation to dryness, benzene was added and the resulting solution evaporated to remove excess acetic acid and peroxide, thereby yielding a white solid. Crystallization from acetone provided 45.9 g. of 5-hydroxy-5-(1-phenylethyl)-barbituric acid, M.P. 202–203.5° C.

Analysis.—Calc'd for $C_{12}H_{12}N_2O_4$ (percent): C, 58.06; H, 4.87; N, 11.29; O, 25.78. Found (percent): C, 58.29; H, 4.95; N, 11.26.

EXAMPLE 2

A mixture of 48.7 g. of the 5-hydroxy-5-(1-phenylethyl)-barbituric acid prepared in Example 1, 300 ml. of glacial acetic acid and 75 ml. concentrated sulfuric acid was heated, with stirring, at 65° C. for one and one-half hours. An additional 50 ml. of acetic acid were added and the mixture stirred with heating for one and one-half hours to yield a brown solution which was quenched with 2.5 liters of ice water containing sodium sulfate. Then the reaction solution was extracted with chloroform and evaporated to dryness to provide a tan solid. A further quantity of solid was obtained from the mother liquor by extraction. Crystallization of the combined solids from benzene/hexane provided pale, tan needles, M.P. 228–230- C. The following analytical data confirmed that 5-acetoxy-5-(1-phenylethyl)-barbituric acid had been obtained.

Analysis.—Calc'd for $C_{14}H_{14}N_2O_5$ (percent): C, 57.93; H, 4.86; N, 9.65; O, 27.56. Found (percent): C, 57.75; H, 4.87; N, 9.61.

Pharmacological testing of this compound gave the following results:

| | Dosage, mg./kg. |
|---|---|
| Acute toxicity—$LD_{50}$ (oral) ----------Ca-- | 200 |
| Analgetic activity: | |
| Hot-Plate $ED_{50}$ (subcutaneous) ---------- | 40 |
| Hot-Plate $ED_{50}$ (oral) ---------- | 50 |
| Phenyl-p-quinone writhing $ED_{50}$ (oral) ------- | 50 |

Time of peak activity: ½ hour.

EXAMPLE 3

The amount of 5.0 g. of 5-hydroxy-5-(1-phenylethyl)-barbituric acid, as prepared in Example 1, was dissolved in a mixture of 50 ml. acetic anhydride and 5 ml. of 48% hydrobromic acid. The mixture was heated at 70–80° overnight, then cooled and poured into ice containing sodium bicarbonate. The product was filtered, washed with water and dried. Crystallization from benzene afforded 4 g. of white crystals, M.P. 228–230° C., identical in all respects with an analytical sample of 5-acetoxy-5-(1-phenylethyl)-barbituric acid.

EXAMPLE 4

The amount of 5 g. of the 5-hydroxy-5-(1-phenylethyl)-barbituric acid prepared in Example 1 was added to a solution of propionic acid (40 ml.) and concentrated sulfuric acid (5 ml.). After heating at 65° C. for twenty hours, the reaction solution was quenched in 500 ml. of ice water. Filtration provided a solid which was dissolved in benzene. Purification was achieved by preparative chromatography on 270 g. silica gel. Elution with a solvent mixture containing 20% ethyl acetate and 80% benzene, by volume, followed by evaporation of the solvent provided an oil which crystallized on standing. Recrystallization from benzene/hexane yielded 5-propionoxy-5-(1-phenylethyl)-barbituric acid, M.P. 186–186.5° C.

Analysis.—Calc'd for $C_{15}H_{16}N_2O_5$ (percent): C, 59.20; H, 5.30; N, 9.21; O, 26.29. Found (percent): C, 59.50; H, 5.23; N, 9.26.

Pharmacological testing of this compound gave the following results:

| | Dosage, mg./kg. |
|---|---|
| Acute toxicity—$LD_{50}$ (oral) | 70 (57.4–85.4) |
| Analgetic activity—Hot-Plate: | |
| $ED_{50}$ (subcutaneous) | 15 |
| $ED_{50}$ (oral) | 13.0 (5.0–34.0) |
| Phenyl-p-quinone writhing: | |
| $ED_{50}$ (subcutaneous) | 6.6 |
| $ED_{50}$ (oral) | 27.0 (22.0–33.2) |

EXAMPLE 5

5-hydroxy-5-(1-phenylethyl)-barbituric acid (2.5 g., prepared as in Example 1) was dissolved in a mixture of 2 ml. of propionyl chloride and 30 ml. of pyridine. The mixture was heated at 75° C. for 20 hours, then cooled and poured into ice containing 30 ml. of concentrated hydrochloric acid. The product was extracted with ethyl acetate, the ethyl acetate solution washed with a saturated sodium bicarbonate solution, with dilute hydrochloric acid solution and finally with water, dried over sodium sulfate and filtered. The solvent was evaporated to yield an oily product which was purified by column chromatography (280 g. silica gel). Elution with 20% ethyl acetate in benzene solution provided 1.8 g. of 5-propionoxy-5-(1-phenylethyl)-barbituric acid, M.P. 186.5° C., identical in all respects with an analytical sample of 5-propionoxy-5-(1-phenylethyl)-barbituric acid.

EXAMPLE 6

The amount of 5.0 g. of 5-hydroxy-5-(1-phenylethyl)-barbituric acid as prepared in Example 1 was added to 40 ml. of isobutyric acid and 7.5 ml. of concentrated sulfuric acid. After heating at 65° C. for 20 hours, the reaction mixture was quenched with 500 ml. of ice water containing sodium sulfate. Then the solution was extracted with ethyl acetate and evaporated to remove solvent. An oily residue was obtained which was chromatographed on 230 g. of Merck silica gel. Elution was carried out with a solvent mixture containing 2 parts of ethyl acetate and 8 parts of benzene (by volume). Evaporation of the solvent provided an oily material which was dissolved in ethyl acetate. The solution was added to 1.2 liters of saturated sodium bicarbonate solution and allowed to stand overnight. Extractions with ethyl acetate followed by washings with standard sodium chloride solution to adjust the pH to 6, yielded a liquid which was dried over sodium sulfate and evaporated to provide a brown oil. This oil was purified further by chromatography (300 g. silica gel). Elution was carried out with a solvent mixture of benzene (8 parts) and ethyl acetate (2 parts). Following evaporation an oil was obtained which crystallized from ether, thereby providing 3.4 g. of 5-isobutyroyloxy-5-(1-phenylethyl)-barbituric acid, M.P. 154–6° C.

Analysis.—Calc'd for $C_{16}H_{18}O_5N_2$ (percent): C, 60.37; H, 5.70; N, 8.80. Found (percent): C, 60.11; H, 5.72; N, 8.55.

Pharmacological testing revealed an $LD_{50}$ (oral) of ca. 100 mg./kg. and an analgetic activity as represented by Hot-Plate $ED_{50}$ (oral) of ca. 25 mg./kg. The time of peak activity was ½ hour.

EXAMPLE 7

Eighty-eight mg. of lithium hydride were added to a solution of 1.5 g. of the 5-propionoxy-5-(1-phenylethyl)-barbituric acid described in Example 4 in 20 ml. of dimethylformamide, and the solution was heated at 50° C. for one-half hour. Then 2 mg. of methyl iodide were added and the solution was stirred at 50° C. overnight and poured into ice water; the product was extracted into ethyl acetate. The combined extracts were washed with saturated sodium chloride solution and dried by filtration through anhydrous sodium sulfate. The solvent was removed by distillation on a Buchi rotary evaporator and the resulting oil chromatographed on 230 g. silica gel. Elution was carried out with 10% ethyl acetate in benzene. After evaporation of the solvent, a pale yellow oil was obtained. The oil crystallized upon standing to provide 1,3-dimethyl - 5 - propionoxy-5-(1-phenylethyl)-barbituric acid.

Analysis.—Calc'd for $C_{17}H_{20}O_5N_2$ (percent): C, 61.43; H, 6.07; N, 8.43. Found (percent): C, 61.47; H, 5.93; N, 8.32.

Pharmacological testing revealed analgetic activity as indicated by a Hot-Plate $ED_{50}$ (oral) of 100 mg./kg.

EXAMPLE 8

5-propionoxy-5-(1'-phenylethyl)-barbituric acid (1.5 g. of the compound described in Example 4) was dissolved in 10 ml. of freshly distilled, dry dimethylformamide. To the solution was added 160 mg. of lithium hydride. After stirring the reaction solution for 5 minutes at room temperature, methyl chloromethyl ether (2.6 ml.) was added and the reaction mixture stirred overnight. Then the reaction mixture was quenched with ice and immediately extracted into ethyl acetate. The ethyl acetate solution was washed with sodium chloride solution, dried and the ethyl acetate was evaporated to yield an oil. This oil was purified by column chromatography (200 g. of silica gel). Elution was 10% ethyl acetate in benzene provided, 1,3-bis (methoxymethyl)-5-propionoxy-5-(1-phenylethyl)-barbituric acid.

Analysis.—Calc'd for $C_{19}H_{24}O_7N_2$ (percent): C, 58.15; H, 6.17; N, 7.14. Found (percent): C, 58.07; H, 6.05; N, 7.39.

Pharmacological testing revealed analgetic activity as evidenced by a Hot-Plate $ED_{50}$ (oral) of 15.6 mg./kg. (10.3–23.7).

EXAMPLE 9

Following the procedure of Example 8, 5-propionoxy-5-(1-phenylethyl)-barbituric acid (1.5 g. of the compound described in Example 4) was dissolved in 20 ml. of freshly distilled, dry dimethylformamide. Lithium hydride (44 mg.) was added and the resulting mixture stirred at 50–60° C. for one-half hour. Then 1 ml. of methyl iodide was added, the mixture was allowed to stand for 2 hours at 60° C., and an additional 1 ml. of methyl iodide was added. After allowing the reaction mixture to stand at 60–70° C. for 16 hours, evaporation under reduced pressure removed the excess methyl iodide. The residual solution was poured into ice containing sodium chloride and the product extracted with ethyl acetate, the ethyl acetate solution washed with sodium chloride, dried and the solvent evaporated. The oily product was purified by column chromatography (300 g. of dry silica gel). Elution with 30 ethyl acetate in benzene provided a pure oil identified as 1-methyl-5-propionoxy-5-(1-phenylethyl)-barbituric acid.

Analysis.—Calc'd for $C_{16}H_{18}N_2O_5$ (percent): C, 60.37; H, 5.70; N, 8.80. Found (percent): C, 60.19; H, 5.71; N, 9.00.

Pharmacological testing indicated a Hot-Plate $ED_{50}$ (oral) of about 32 mg./kg.

EXAMPLE 10

5-propionoxy-5-(1'-phenylethyl)-barbituric acid (1.5 g. as prepared in Example 4) was dissolved in 25 ml. of dimethylformamide. To the solution was added 300 mg. of lithium hydride. The resulting clear suspension was stirred for 30 minutes at room temperature, then bromomethyl acetate (3.6 g.) was added while keeping the temperature of the mixture at 10–15° C. The mixture was stirred overnight at room temperature, then poured into 500 g. ice. The product was extracted with ethyl acetate. The ethyl acetate solution was dried over sodium sulfate, filtered and the solvent evaporated to provide an oil which was purified by preparative chromatography (200 g. silica gel). Elution with a solvent mixture containing 9 parts of benzene and one part of ethyl acetate, by volume, provided a colorless oil identified as 1,3-bis-acetoxymethyl-5-propionoxy-5-(1-phenylethyl)-barbituric acid. The infrared spectrum showed a characteristic carbonyl band at 1761–1695 cm.$^{-1}$ and a C—O band at 1250 cm.$^{-1}$; a band at 1610 cm.$^{-1}$ indicated the presence of an aromatic group.

Analysis.—Calc'd for $C_{21}H_{24}O_9N_2$ (percent): C, 56.24; H, 5.39; N, 6.25. Found (percent): C, 56.03; H, 5.23; N, 6.30.

Pharmacological testing indicated analgetic activity when tested by the Hot-Plate method.

EXAMPLE 11

(A) Preparation of reactants

To a solution of 300 ml. absolute ethanol and 4.6 g. of sodium was added 47.8 g. of diethyl bromomalonate. The mixture was refluxed for four hours and then cooled to room temperature. The sodium bromide precipitate was separated by filtration and the filtrate was concentrated. Vacuum distillation provided diethyl ethoxy malonate, which was collected at 135–140° C./~5 mm. Hg.

Analysis.—Calc'd for $C_9H_{16}O_5$ (percent): C, 52.93; H, 7.90. Found (percent): C, 52.96; H, 7.84.

To a solution of 100 ml. of absolute ethanol and 2.3 g. of sodium was added 20.4 g. of diethyl ethoxy malonate. The mixture was stirred for two hours at room temperature. Then 18.5 g. of (1-bromoethyl)-benzene was added and the mixture was refluxed for six hours. Sodium bromide (9.1 g.) was collected by filtration. The filtrate was concentrated and diethyl-ethoxy-1-phenylethyl malonate was distilled at 175–180° C./~4–5 mm. Hg.

(B) Preparation of 5-ethoxy-5-(1-phenylethyl)-barbituric acid

To a solution of 100 ml. absolute ethanol and 1.38 g. of sodium was added 3.7 g. of urea. The mixture was stirred until a clear solution was formed. Then 6.1 g. of diethyl-ethoxy-1-phenylethyl malonate was added dropwise; the mixture was refluxed overnight and then cooled to room temperature. After removal of the solvent by evaporation, the residue was dissolved in water. The aqueous solution was acidified with concentrated hydrochloric acid and the crystalline precipitate was removed by filtration, washed with water and then with ether to provide 5-ethoxy-5-(1-phenylethyl)-barbituric acid, M.P. 230–233° C.

Analysis.—Calc'd for $C_{14}H_{16}O_4N_2$ (percent): C, 60.86; H, 5.84; N, 10.14. Found (percent): C, 61.14; H, 5.84; N, 10.40.

Pharmacological testing indicated analgetic activity, as evidenced by an estimated Hot-Plate $ED_{50}$ of 500 mg./kg.

EXAMPLE 12

(A) Preparation of reactants

Diethylmalonate (480 g.) was added to a solution of sodium (69 g.) in absolute ethanol (1 liter) and the resulting solution stirred at room temperature for thirty minutes. Then ω-bromo-toluene (513.12 g.) was added over a period of 2 hours to the reaction solution. The resulting mixture was heated at reflux overnight, and the sodium bromide by-product was removed by filtration. After washing with ethanol, the filtrate was evaporated to a small volume. Vacuum distillation provided diethyl benzyl malonate, b.p. 160–180° C./10 mm. Hg.

Urea (180 g.) was added to a solution of sodium (23 g.) in absolute ethanol (500 ml.). After heating at 78° C. for one-half hour, the reaction mixture was cooled to room temperature. Then 80 g. of the diethyl benzyl malonate was added and the reaction mixture refluxed overnight. After cooling to room temperature, excess ethanol was removed by evaporation under reduced pressure. Approximately 600 g. of ice water, to which 2 N hydrochloric acid had been added to provide a solution having a pH of 1, was added and the reaction mixture stirred for two hours. A solid product was separated from the mixture by filtration, washed with water and dried. The product was crystallized from ethyl alcohol, to provide 5-benzyl-barbituric acid.

Analysis.—Calc'd for $C_{11}H_{10}N_2O_3$ (percent): C, 60.54; H, 4.30; N, 11.96. Found (percent): C, 56.44; H, 4.16; N, 12.88.

(B) Preparation of 5-hydroxy-5-benzyl-barbituric acid

The amount of 3.6 g. of the 5-benzyl barbituric acid prepared in Part A was dissolved in 50 ml. of acetic acid and 6.5 ml. of 30 hydrogen peroxide solution by heating at 50° C. Then the reaction solution was allowed to cool overnight. Methanol (15 ml.) and water (15 ml.) were added and the solution was allowed again to stand overnight. Evaporation to dryness provided a white solid which was crystallized from a small amount of acetone to yield 5-hydroxy-5-benzyl-barbituric acid, M.P. 222–225° C.

Analysis.—Calc'd for $C_{11}H_{10}O_4N_2$ (percent): C, 56.41; H, 4.30; N, 11.96. Found (percent): C, 56.44; H, 4.16; N, 11.80.

EXAMPLE 13

The amount of 1.0 g. of the 5-hydroxy-5-benzyl-barbituric acid prepared in Example 12 was added to a solution of 10 ml. of propionic acid and 1.5 ml. of concentrated sulfuric acid. After stirring at 65° C. overnight, the reaction mixture was allowed to cool and quenched with 300 ml. of ice water. Then the solution was extracted with ethyl acetate and the extract washed with saturated sodium chloride and filtered through anhydrous sodium sulfate. After evaporation to remove solvent, an orange liquid was obtained. Benzene was added to this orange liquid and the solution evaporated to remove excess acetic acid. The resulting liquid was separated by preparative chromatography on 200 g. silica gel employing 20% ethyl acetate in benzene as the eluent. After evaporation of the solvent, a pale, yellow oil was obtained; this oil crystallized on standing to provide a white product which was recrystallized from benzene/hexane to yield 5-propionoxy-5-benzyl-barbituric acid, M.P. 174.5–176° C.

Analysis.—Calc'd for $C_{14}H_{14}N_2O_5$ (percent): C, 57.93; H, 4.86; N, 9.65. Found (percent): C, 58.22; H, 4.81; N, 9.61.

Pharmacological testing indicated analgetic activity, the Hot-Plate $ED_{50}$ (oral) being less than 200 mg./kg.

EXAMPLE 14

(A) Preparation of reactants

N-bromo-succinimide (170 g.) was added to a mixture of 1-propyl benzene (100 g.) and benzoyl peroxide (100 mg.) in 400 ml. of carbon tetrachloride and 80 ml. of hexane. Initiation, as indicated by strong refluxing, occurred after the reaction mixture was subjected to ultraviolet illumination for 15 minutes. After illumination for an additional 30 minutes the succinimide, which was formed as a by-product, was removed by filtration. Evaporation of the filtrate provided 1-bromo-1-phenyl propane.

Diethylmalonate (135 g.) was added to a solution of sodium (19 g.) in 350 ml. of absolute ethanol. Then 1-bromo-1-phenyl propane, obtained as described above, was added dropwise over a period of one hour. After heating at reflux overnight, the reaction mixture was allowed to cool to room temperature and filtered to remove sodium bromide by-product. Distillation provided diethyl-1-phenylpropyl malonate (100 g.), B.P. 145–160° C./20 mm. Hg.

Urea (240 g.) was added to a solution of sodium (54.8 g.) in absolute ethanol (800 ml.). After stirring for one-half hour, a homogeneous solution was obtained. Then 278.4 g. of the diethyl 1-phenylpropyl malonate was added and the solution heated at reflux overnight. The resulting thick syrup was evaporated to remove most of the ethanol and then quenched with ice water. Hydrochloric acid was added to adjust the pH of the reaction solution to 2; a thick solid separated from the solution. This solid product was separated by filtration, washed with water and recrystallized from ethanol to provide N-monocarbamido-1-phenylpropyl-malondiamide, M.P. 188–189° C.

The amount of 50 g. of the N-monocarbamido-1-phenylpropylmalondiamide prepared in part A was added to a solution of sodium (11.5 g.) in absolute ethanol (250 ml.). After heating at reflux for 20 hours, the reaction solution was allowed to cool and then evaporated to near dryness. Water was added to provide a homogeneous solution. Upon the addition of hydrochloric acid, white crystals separated from the solution. These crystals were separated by filtration and recrystallized from an equi-volume solution of absolute ethanol in water to provide 5-(1-phenylpropyl)-barbituric acid, M.P. 181.5–183° C.

Analysis.—Calc'd for $C_{13}H_{14}O_3N_2$ (percent): C, 63.40; H, 5.73; N, 11.38. Found (percent): C, 63.38; H, 5.75; N, 11.43.

(B) Preparation of 5-hydroxy-5-(1-phenylpropyl)-barbituric acid

The amount of 5.0 g. of the 5-(1-phenylpropyl)-barbituric acid prepared in part A was added to 50 ml. of acetic acid in 15 ml. of 30% hydrogen peroxide solution and the resulting mixture heated to 65° C. in order to provide a homogeneous solution. After stirring at room temperature overnight, solvent was evaporated and the resulting solid residue washed with ether. Filtration provided an orange solid which was recrystallized from acetone/hexane to provide 5-hydroxy-5-(1-phenylpropyl)-barbituric acid, M.P. 210–212° C.

Analysis.—Calc'd for $C_{13}H_{14}N_2O_4$ (percent): C, 59.53; H, 5.30; N, 10.68. Found (percent): C, 59.62; H, 5.32; N, 10.85.

EXAMPLE 15

A mixture of 2.5 g. of the 5-hydroxy-5-(1-phenylpropyl)-barbituric acid prepared in Example 14, 20 ml. of propionic acid and 3.8 ml. of concentrated sulfuric acid was heated, with stirring, at 65° C. overnight. After allowing the reaction mixture to cool to room temperature, it was quenched with 600 ml. of saturated sodium bicarbonate solution to a pH of 7.8. Then the reaction mixture was extracted with ethyl acetate, and the extract washed with sodium chloride solution, dried over sodium sulfate and evaporated to remove the solvent. Preparative column chromatography of the resulting liquid on 300 g. silica gel employing 20% ethyl acetate in benzene as an eluent, provided a yellow oil which crystallized on standing. After crystallization from ether, followed by recrystallization from acetone-hexane, 5 - propionoxy-5-(1-phenylpropyl)-barbituric acid, M.P. 156–158° C. was obtained.

Analysis.—Calc'd for $C_{16}H_{18}N_2O_5$ (percent): C, 60.37; H, 5.70; N, 8.80. Found (percent): C, 60.29; H, 5.77; N, 8.83.

Pharmacological testing indicated analgetic activity, the Hot-Plate $ED_{50}$ (oral) being about 200 mg./kg. The time of peak activity was one-half hour.

EXAMPLE 16

(A) Preparation of reactants

Diethylmalonate (165 g.) was added to a solution of sodium (23 g.) in absolute ethanol (500 ml.). Then 200 g. of β-bromoisopropyl benzene was added and the reaction mixture heated at reflux for six hours. After allowing the mixture to cool to room temperature, it was acidified to a pH of .6 with 20 ml. of glacial acetic acid. After filtration to separate sodium bromide, the filtrate was evaporated under reduced pressure to yield an oil. Distillation was carried out at 1 mm. Hg and the fraction boiling at 140–160° C. was collected to provide a total of 25 g. of diethyl-2-phenylpropyl malonate.

Urea (126 g.) was added to a solution of sodium (24.2 g.) in absolute ethanol (400 ml.). Then 123 g. of the diethyl-2-phenylpropyl malonate prepared in part A was added and the reaction mixture heated at reflux for 16 hours. After evaporating to a small volume, the mixture was dissolved in water and acidified with hydrochloric acid in order to precipitate a solid product. This solid was separated from the mixture by filtration and crystallized from ethanol to provide 5 - (2-phenylpropyl)-barbituric acid, M.P. 204–206° C.

*Analysis.*—Calc'd for $C_{13}H_{14}O_3N_2$ (percent): C, 63.40; H, 5.73; N, 11.38. Found (percent): C, 63.48; H, 5.80; N, 11.22.

(B) Preparation of 5-hydroxy-5-(2-phenylpropyl)-barbituric acid

The amount of 5.0 g. of the 5-(2-phenylpropyl)-barbituric acid prepared in part A was dissolved in 50 ml. of glacial acetic acid and 15 ml. of 30% hydrogen peroxide solution by heating, with stirring, to about 65° C. for one-half hour. After allowing the resulting reaction solution to cool to room temperature, stirring with continued overnight. Then 30 ml. of methanol and 30 ml. of sodium were added, stirring was continued for a few hours and the reaction mixture evaporated to remove solvents. A solid product resulted, which was crystallized from acetone to provide 5-hydroxy-5-(2-phenylpropyl)-barbituric acid, M.P. 206–208° C.

*Analysis.*—Calc'd for $C_{13}H_{14}N_2O_4$ (percent): C, 59.53; H, 5.38; N, 10.68. Found (percent): C, 59.40; H, 5.42; N, 10.64.

EXAMPLE 17

5-hydroxy-5-(2-phenylpropyl)-barbituric acid (2.5 g. of the compound of Example 16) was added to a solution of 20 ml. of propionic acid and 3.75 ml. of concentrated sulfuric acid. After stirring at 65° C. overnight, the reaction mixture was allowed to cool, quenched with saturated sodium bicarbonate solution and extracted with ethyl acetate. After drying through anhydrous sodium sulfate, the mixture was evaporated to remove solvent thereby yielding a yellow oil which crystallized upon standing. Further purification was achieved by column chromatography. The crystalline mass was dissolved in benzene and absorbed on 230 g. silica gel. Elution with a solvent mixture containing 2 parts ethyl acetate and 8 parts of benzene, followed by evaporation of the solvent, provided a white solid which was crystallized from acetone/hexane to furnish 5-propionoxy-5-(2-phenylpropyl)-barbituric acid.

*Analysis.*—Calc'd for $C_{16}H_{18}N_2O_5$ (percent): C, 60.37; H, 5.70; N, 8.80. Found (percent): C, 60.68; H, 5.72; N, 8.81.

Pharmacological testing indicated a Hot-Plate $ED_{50}$ of about 100 mg./kg.

EXAMPLE 18

(A) Preparation of reactants

Sodium (5.75 g.) was dissolved in absolute ethanol (100 ml.). To the solution was added diethyl malonate (40 g.), followed by the dropwise addition of 2-bromophenyl propane (50 g.). The mixture was heated at reflux for four hours, then cooled to room temperature. The pH of the solution was adjusted to five, the solvent was evaporated and the residue was filtered. Distillation of the filtrate provided 20.4 g. of diethyl-1-phenyl-2-propylmalonate, boiling at 140–160° C./2 mm. Hg.

Sodium (4.6 g.) was dissolved in absolute ethanol (50 ml.). To the solution was added urea (24 g.) followed by dropwise addition of diethyl-1-phenyl-2-propyl-malonate (20.4 g.). The mixture was kept at reflux overnight then cooled to room temperature. Then the solvent was evaporated and ice was added to the residue. Acidification of the mixture with dilute hydrochloric acid gave a solid product which was crystallized from absolute ethanol to provide 5-(1-phenyl-2-propyl)-barbituric acid, M.P. 203–206° C.

*Analysis.*—Calc'd for $C_{13}H_{14}O_3N_2$ (percent): C, 63.40; H, 5.73; N, 11.38. Found (percent): C, 63.38; H, 5.70; N, 11.30.

(B) Preparation of 5-hydroxy-5-(1-phenyl-2-propyl)-barbituric acid

The amount of 2.5 g. of the 5-(1-phenyl-2-propyl)-barbituric acid prepared in part A was dissolved in 50 ml. of acetic acid. To the solution was added 5 ml. of 30% hydrogen peroxide solution and the resulting mixture was heated to 60° C. for two hours and then allowed to stand overnight. Water (25 ml.) and methanol (35 ml.) were added and the mixture was stirred for one hour. Evaporation of solvents provided a solid residue. This residue was dissolved in ether, filtered, and the filtrate evaporated to yield a solid product identified as 5-hydroxy-5-(1-phenyl-2-propyl)-barbituric acid. The infrared spectrum showed a characteristic NH band at 3460 cm.$^{-1}$, an OH band at 3226 cm.$^{-1}$, CO bands at 1730, 1704 and 1692 cm.$^{-1}$ and aromatic ring bands at 1610 and 1580 cm.$^{-1}$.

EXAMPLE 19

5-hydroxy-5-(1-phenyl-2-propyl)-barbituric acid (2 g.) obtained as described in Example 18, was dissolved in a mixture of 16 ml. of propionic acid and 2 ml. of concentrated sulfuric acid by heating the mixture to 65° C. overnight. After cooling to room temperature, the mixture was poured into ice containing sodium bircarbonate and the product was extracted with ethyl acetate. The ethyl acetate solution was washed with sodium chloride, dried over sodium sulfate, filtered and the solvent was evaporated. The resulting oily product was purified by column chromatography (150 g. silica gel). Elution with a solvent mixture containing eight parts of benzene and two parts of ethyl acetate by volume provided a white solid, M.P. 122–127° C. identified as 5-propionoxy-5-(1-phenyl-2-propyl)-barbituric acid.

*Analysis.*—Calc'd for $C_{16}H_{18}N_2O_5$ (percent): C, 60.37; H, 5.70; N, 8.80. Found (percent): C, 60.76; H, 5.67; N, 8.69.

Pharmacological testing indicated a Hot-Plate $ED_{50}$ of about 100 mg./kg.

EXAMPLE 20

(A) Preparation of reactants

Following the procedure of Example 1, bromine (176 g.) was added, with stirring, to refluxing p-nitroethylbenzene (151.2 g.) over a period of one hour under illumination by ultraviolet light. After completion of the addition, the reaction mixture was stirred for one additional hour. The reaction mixture was subjected to vacuum distillation for one hour at 100° C. in order to purge off any hydrobromic acid. The residue contained the desired 1-bromoethyl-p-nitrobenzene.

Diethylmalonate (160 g.) was added to a solution of sodium (23 g.) in 500 ml. absolute ethanol and the resulting mixture stirred for ten minutes at reflux. Then the total amount of 1-bromoethyl-p-nitrobenzene prepared above was added to the reaction mixture over a period of one hour. After heating at reflux for an additional six hours, the reaction mixture was allowed to cooled to room temperature. Hydrochloric acid (20 ml. of 38% solution) was added to adjust the pH of the reaction mixture to 4. After allowing the reaction mixture to stand overnight, the sodium bromide by-product was separated by filtration. Ether was added to the filtrate thereby precipitating a solid product which was separated by filtration and crystallized from methanol to provide 210 g. of diethyl-1-p-nitrophenylethyl malonate.

Analysis.—Calc'd for $C_{15}H_{19}O_6N$ (percent): C, 58.24; H, 6.19; N, 4.53. Found (percent): C, 58.34; H, 6.18; N, 4.43.

Urea (25 g.) was added to a solution of sodium ethoxide, prepared from sodium (5.5 g.) and ethanol (100 ml.). Then a hot solution of 31 g. of the diethyl - 1 - p-nitrophenylethyl malonate in 150 ml. absolute ethanol was added and the resulting mixture heated at reflux for five hours. After allowing the reaction mixture to cool overnight, filtration provided a solid red material which was dissolved in water and precipitated with hydrochloric acid; crystallization from hot absolute methanol provided 20 g. of pale yellow needles identified as 5-(1-p-nitrophenylethyl)-barbituric acid.

Analysis.—Calc'd for $C_{12}H_{11}O_5N_3$ (percent): C, 51.99; H, 4.00; N, 15.16. Found (percent): C, 52.03; H, 4.09; N, 15.01.

(B) Preparation of 5-(1-p-nitrophenylethyl)-5-hydroxybarbituric acid

To a mixture of 150 ml. of glacial acetic acid and 10 ml. of 30% hydrogen peroxide was added 8.31 g. of the 5 - (1 - p - nitrophenylethyl) - barbituric acid prepared in part A. The resulting mixture was stirred at 70–75° C. for five hours. Then the mixture was cooled to room temperature and 100 ml. of methanol was added. The solvent was evaporated, leaving a solid precipitate which was washed with water and recrystallized from tetrahydrofuran to provide 7 g. of 5 - hydroxy - 5 - (1-p-nitrophenylethyl)-barbituric acid, M.P. 282–286° C.

Analysis.—Calc'd for $C_{12}H_{11}N_5O_6$ (percent): C, 49.15; H, 3.45; N, 14.33. Found (percent): C, 49.43; H, 3.73; N, 14.18.

EXAMPLE 21

Propionic acid (25 ml.) was added to a mixture of concentrated sulfuric acid (5 ml.) in methane sulfonic acid (5 ml.). Then 5-hydroxy - 5 - (1-p-nitrophenylethyl)-barbituric acid (1 g.) was added and the reaction mixture heated, with stirring at 85° C. for forty-eight hours. The resulting homogeneous solution was allowed to cool to room temperature and then poured into about 150 ml. of ice water. Filtration provided a precipitate which was crystallized from ethyl acetate ether to yield 710 mg. of 5-propionoxy - 5 - (1-p-nitrophenylethyl)-barbituric acid, M.P. 240–241° C.

Analysis.—Calc'd for $C_{15}H_{15}N_3O_7$ (percent): C, 51.58; H, 4.33; N, 12.03. Found (percent): C, 51.67; H, 4.33; N, 11.93.

Pharmacological testing indicated a Hot-Plate $ED_{50}$ (oral) of about 500 mg./kg.; the time of peak activity was one hour.

EXAMPLE 22

(A) Preparation of reactants

Diethyl malonate (26 g.) was added to a solution of sodium (3.7 g.) in 100 ml. of absolute ethanol. After heating at reflux for 10 minutes, p-chloromethyl anisol (25 g.) was added and the resulting reaction mixture heated at reflux overnight. After allowing the mixture to cool to room temperature, it was acidified to a pH of 1 with hydrochloric acid. Then the mixture was evaporated to remove solvent and the sodium chloride by-product was removed by filtration. Distillation in vacuo provided 24 g. of diethyl-p-methoxybenzyl malonate, 180–220° C./2 mm. Hg.

Analysis.—Calc'd for $C_{15}H_{20}O_5$ (percent): C, 64.27; H, 7.19; O, 28.54. Found (percent): C, 64.27; H, 7.25.

Urea (24 g.) was added to a solution of sodium ethoxide, prepared from sodium (4.6 g.) and ethanol (100 ml.). Then 24 g. of the diethyl-p-methoxybenzyl malonate was added and the reaction mixture heated overnight at reflux with stirring. After allowing the mixture to cool to room temperature, a precipitate was separated by filtration, dissolved in water, acidified to a pH of 1 with hydrochloric acid, separated again by filtration and washed with water. This solid was dissolved in 500 ml. of hot methanol/ethanol mixture, filtered, the filtrate concentrated to 250 ml. Upon cooling, crystals appeared which were separated by filtration to provide 15 g. of 5-(p-methoxybenzyl)-barbituric acid.

Analysis.—Calc'd for $C_{12}H_{12}O_4N_2$ (percent): C, 58.06; H, 4.87; N, 11.29. Found (percent): C. 58.17; H, 4.76; N, 11.56.

(B) Preparation of 5-(p-methoxybenzyl)-5-hydroxybarbituric acid

The amount of 20 ml. of 30% hydrogen peroxide solution was added to 150 ml. of glacial acetic acid. To the clear solution, 5-p-methoxybenzyl barbituric acid (7.44 g.) was added and the mixture was heated to 60–65° C. for five hours and then stirred overnight at room temperature. Methanol (100 ml.) was added to the mixture. After solvent removal by evaporation on the steam bath, the resulting concentrated solution was treated with water to provide a crystalline precipitate. The precipitate was separated by filtration and washed with water to provide 5.9 g. of 5-hydroxy-5-(p-methoxybenzyl)-barbituric acid, M.P. 222–223° C.

Analysis.—Calc'd for $C_{12}H_{12}N_2O_5$ (percent): C, 54.54; H, 4.58; N, 10.60. Found (percent): C, 54.71; H, 4.75; N, 10.39.

EXAMPLE 23

The amount of 1 g. of 5-hydroxy-5-(p-methoxybenzyl)-barbituric acid was added to a solution of 20 ml. of propionic acid in 3 ml. of concentrated sulfuric acid. After stirring at 65–70° C. for eight hours, the reaction solution was poured into 100 ml. of ice water and crude product extracted into ethyl acetate. The ethyl acetate solution was washed with water, dried over sodium sulfate and ethyl acetate evaporated under reduced pressure, leaving a solid residue. Crystallization from aqueous methanol provided 500 mg. of 5-propionoxy-5-(p-methoxybenzyl)-barbituric acid, M.P. 217–219° C.

Analysis.—Calc'd for $C_{15}H_{16}N_2O_6$ (percent): C, 56.25; H, 5.04; N, 8.75. Found (percent): C, 56.27; H, 5.12; N, 8.65.

Pharmacological testing indicated a Hot-Plate $ED_{50}$ (oral) of about 500 mg./kg.

EXAMPLE 24

(A) Preparation of reactants

Diethyl malonate (176 g.) was added to a solution of sodium (23.5 g.) in 500 ml. of absolute ethanol. Then p-chlorobenzylchloride (126.58 g.) was added and the resulting reaction mixture heated at reflux overnight. After allowing the mixture to cool to room temperature it was acidified to a pH of 1 with hydrochloric acid and filtered to remove sodium chloride by-product. Evaporation of the filtrate to a small volume provided crystals consisting of a by-product which were removed by filtration. Distillation of the mother liquor provided 120 g. of diethyl-p-chlorobenzyl malonate, 160–180° C./5 mm. Hg.

Analysis.—Calc'd for $C_{14}H_{17}O_4Cl$ (percent): C, 59.04; H, 6.01; Cl, 12.48. Found (percent): C, 59.10; H, 5.97; Cl, 12.66.

Diethyl-p-chlorobenzyl malonate (120 g.) was added to a solution of urea (120 g.) in sodium ethoxide, which had been prepared from sodium (23 g.) and absolute ethanol (500 ml.). The reaction mixture was heated with stirring at reflux for four hours and then allowed to cool overnight. Filtration provided a solid which was dissolved in water, acidified with concentrated hydrochloric acid to a pH of one. The precipitate was evaporated by filtration, washed with water and crystallized from hot absolute ethanol to yield 71.5 g. of 5-(p-chlorobenzyl)-barbituric acid.

Analysis.—Calc'd for $C_{11}H_9O_3N_2Cl$ (percent): C, 52.27; H, 3.59; N, 11.08; O, 18.99; Cl, 14.07. Found (percent): C, 52.20; H, 3.54; N, 11.10.

(B) Preparation of 5-hydroxy-5-(p-chlorobenzyl)-barbituric acid

The amount of 10.1 g. of the 5-(p-chlorobenzyl)-barbituric acid prepared in part A was dissolved in 150 ml. of glacial acetic acid and the resulting solution heated with stirring to 60° C. Then 13 ml. of 30% hydrogen peroxide solution was added and the reaction mixture heated to 80° C. The resulting solution was cooled to 60° C. and held at that temperature for three hours and then cooled to room temperature and allowed to stand overnight. Methanol (80 ml.) was added to the reaction solution. Solvent evaporation under reduced pressure provided a solid crystalline residue which was recrystallized from a methanol/ether mixture to yield 7.6 g. of 5-hydroxy-5-(p-chlorobenzyl)-barbituric acid, M.P. 242–245° C.

EXAMPLE 25

5-hydroxy-5-(p-chlorobenzyl)-barbituric acid (7.6 g.) was added to a solution of 60 ml. of propionic acid in 6 ml. of concentrated sulfuric acid and the resulting reaction mixture was stirred at 70° C. overnight. After allowing the mixture to cool to room temperature, it was poured into 200 ml. of ice water, thereby providing a white precipitate which was separated by filtration. The precipitate was dissolved in benzene and absorbed on silica gel. Elution with a solvent mixture containing seven parts by volume of benzene and three parts by volume of ethyl acetate provided, after evaporation of the solvent, 9.3 g. of solid which was crystallized from ethyl acetate to yield 5-propionoxy-5-(p-chlorobenzyl)-barbituric acid, M.P. 237–240° C.

Analysis.—Calc'd for $C_{14}H_{13}O_5N_2Cl$ (percent): C, 51.79; H, 4.04; N, 8.63; Cl, 10.91. Found (percent): C, 51.82; H, 4.47; N, 8.52.

Pharmacological testing indicated a Hot-Plate $ED_{50}$ (oral) of about 500 mg./kg.

EXAMPLE 26

To a solution of 5-hydroxy-5-(1-phenylethyl)-barbituric acid (2.5 g.) in pyridine (25 ml.) was added trimethyl chlorosilane (1.1 g.). After refluxing overnight, the mixture was cooled to room temperature and poured into ice containing 25 ml. of concentrated hydrochloric acid. The product was extracted with ethyl acetate, the ethyl acetate solution washed with a sodium chloride solution, dried and the solvent evaporated. The resulting oily product was purified by column chromatography (230 g. silica gel). Elution with 20% ethyl acetate in benzene provided white crystalline material, identified as 5-trimethylsilyloxy - 5 - (1-phenylethyl)-barbituric acid, M.P. 156–159° C.

Analysis.—Calc'd for $C_{16}H_{20}N_2O_4Si$ (percent): C, 56.22; H, 6.29; N, 8.74; Si, 8.76. Found (percent): C, 56.05; H, 6.21; N, 8.73; Si, 8.78.

Pharmacological testing indicated a Hot-Plate $ED_{50}$ (oral) of about 165 mg./kg.

EXAMPLE 27

To a solution of 5-hydroxy-5-(1-phenylethyl)-barbituric acid (7.5 g.) in pyridine (75 ml.) was added triethyl chlorosilane (5 g.) and the mixture was kept at reflux overnight. Then the mixture was cooled to room temperature and poured into ice containing 75 ml. of concentrated hydrochloric acid. The product was extracted with ethyl acetate, the ethyl acetate solution washed with a sodium chloride solution, dried and the solvent evaporated. The oily product was purified by column chromatography (230 g. silica gel). Elution with a solvent mixture containing nine parts of benzene and one part of ethyl acetate, by volume, provided a white solid identified as 5-triethylsilyloxy-5-(1-phenylethyl)-barbituric acid, M.P. 101–104° C.

Analysis.—Calc'd for $C_{18}H_{26}N_2O_4Si$ (percent): C, 59.64; H, 7.23; N, 7.73; Si, 7.75. Found (percent): C, 59.86; H, 7.18; N, 7.88; Si, 7.64.

Pharmacological testing indicated a Hot-Plate $ED_{50}$ (oral) of about 500 mg./kg.

What is claimed is:

1. A compound having the formula

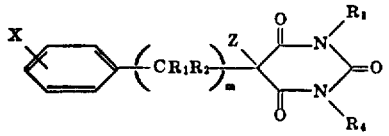

wherein m is 1 or 2; $R_1$ and $R_2$ are independently selected hydrogen, methyl or ethyl, with the provisos that the radical $(CR_1R_2)_m$ can contain no more than one ethyl group or two methyl groups, that when m is 1 said radical contains at least one hydrogen and that when m is 2 said radical contains at least two hydrogens; $R_3$ and $R_4$ are independently selected hydrogen or methyl, or $R_3$ and $R_4$ are both methoxymethyl or acetoxymethyl; X is hydrogen, chlorine, $—NO_2$ or methoxy; and Z is

[hydroxyl,]—O—R' or $-O-\overset{O}{\overset{\|}{C}}-R'$ wherein R' is alkyl having 1 to 3 carbon atoms, or $—OSi(R'')_3$ wherein R'' is methyl or ethyl.

2. The compound of claim 1 wherein Z is $$-O-\overset{O}{\overset{\|}{C}}-R'$$

wherein R' is alkyl having 1 to 3 carbon atoms.

3. The compound of claim 2 wherein m is 1 and X, $R_3$ and $R_4$ are hydrogen.

4. The compound of claim 3 having the name 5-acetoxy-5-(1-phenylethyl)-barbituric acid.

5. The compound of claim 3 having the name 5-propionoxy-5-(1-phenylethyl)-barbituric acid.

6. The compound of claim 2 wherein m is 2 and X, $R_3$ and $R_4$ are hydrogen.

7. The compound of claim 6 having the name 5-propionoxy-5-(2-phenylpropyl)-barbituric acid.

8. The compound of claim 6 having the name 5-propionoxy-5-(1-phenyl-2-propyl)-barbituric acid.

9. The compound of claim 2 wherein m is 1, X is hydrogen and $R_3$ and $R_4$ are independently selected hydrogen or methyl or are both methoxymethyl or acetoxymethyl.

10. The compound of claim 9 having the name 1,3-dimethyl-5-propionoxy-5-(1-phenylethyl)-barbituric acid.

11. The compound of claim 9 having the name 1,3-bis-(methoxymethyl) - 5 - propionoxy-5-(1-phenylethyl)-barbituric acid.

12. The compound of claim 9 having the name 1-methyl-5-propionoxy-5-(1-phenylethyl)-barbituric acid.

13. The compound of claim 9 having the name 1,3-bis-acetoxymethyl - 5 - propionoxy-5-(1-phenylethyl)-barbituric acid.

14. The compound of claim 2 wherein m is 1, $R_3$ and $R_4$ are hydrogen and X is nitro, chloro or methoxy.

15. The compound of claim 1 wherein Z is —O—R' wherein R' is alkyl having 1 to 3 carbon atoms.

16. The compound of claim 1 wherein Z is $$—OSi(R'')_3$$

wherein R'' is methyl or ethyl.

17. The compound of claim 16 having the name 5-trimethylsilyloxy-5-(1-phenylethyl)-barbituric acid.

[18. The compound of claim 1 wherein Z is hydroxyl.]

References Cited

The following references, cited by the Examiner, are of record in the patented file of this patent or the original patent.

UNITED STATES PATENTS 3,464,990 9/1969 Brossi et al. -------- 260—257

DONALD G. DAUS, Primary Examiner

A. M. T. TIGHE, Assistant Examiner

U.S. Cl. X.R.

260—475 S C; 424—254